US012578966B2

(12) United States Patent (10) Patent No.: US 12,578,966 B2
Choi et al. (45) Date of Patent: Mar. 17, 2026

(54) CONTROL UNIT, DATA STORAGE DEVICE, HOST DEVICE AND COMPUTING SYSTEM

(71) Applicant: SK hynix Inc., Gyeonggi-do (KR)

(72) Inventors: Jung Min Choi, Gyeonggi-do (KR); Byung Il Koh, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 25 days.

(21) Appl. No.: 18/650,085

(22) Filed: Apr. 30, 2024

(65) Prior Publication Data

US 2025/0217152 A1 Jul. 3, 2025

(30) Foreign Application Priority Data

Dec. 28, 2023 (KR) ........................ 10-2023-0193799

(51) Int. Cl.
*G06F 9/38* (2018.01)
*G06F 9/30* (2018.01)

(52) U.S. Cl.
CPC ........ *G06F 9/3836* (2013.01); *G06F 9/30189* (2013.01)

(58) Field of Classification Search
CPC ............... G06F 9/3836; G06F 9/30189; G06F 13/1626; G06F 3/061; G06F 3/0659; G06F 3/0661; G06F 3/0679; G06F 13/1668; G06F 3/0658; G06F 3/0673; G06F 13/4068; G06F 13/4282
See application file for complete search history.

(56) References Cited

U.S. PATENT DOCUMENTS

| | | | |
|---|---|---|---|
| 9,491,098 B1 * | 11/2016 | Wilson | H04L 47/125 |
| 2021/0240655 A1 | 8/2021 | Das Sharma | |
| 2022/0070115 A1 * | 3/2022 | Brewer | H04L 49/109 |
| 2022/0188033 A1 * | 6/2022 | Cho | G06F 3/0679 |
| 2022/0342841 A1 * | 10/2022 | Choudhary | G06F 13/4221 |
| 2023/0022544 A1 | 1/2023 | Willhalm et al. | |

FOREIGN PATENT DOCUMENTS

CN 116325693 A 6/2023

OTHER PUBLICATIONS

Extended European Search Report for European Patent Application No. 24217324.3 issued by the European Patent Office on May 12, 2025.

* cited by examiner

*Primary Examiner* — Farley Abad
(74) *Attorney, Agent, or Firm* — IP & T GROUP LLP

(57) ABSTRACT

In an embodiment of the present disclosure, processing order flags are set in flits transmitted and received between a host device and a data storage device, and in-order processing or out-of-order processing is controlled based on the processing order flags. Therefore, it is possible to provide measures capable of easily preventing occurrence of an error due to out-of-order processing of a flit while not degrading the efficiency of processing the flits transmitted and received.

18 Claims, 8 Drawing Sheets

CONTROL UNIT, DATA STORAGE DEVICE, HOST DEVICE AND COMPUTING SYSTEM

CROSS-REFERENCE TO RELATED APPLICATION

The present application claims priority under 35 U.S.C. § 119 (a) to Korean Patent Application No. 10-2023-0193799 filed on Dec. 28, 2023, which is incorporated herein by reference in its entirety.

BACKGROUND

1. Technical Field

Various embodiments of the present disclosure generally relate to a control unit, a data storage device, a host device and a computing system.

2. Related Art

A computing system may include a host device and a locally located storage device. The host device may perform processing on data using the locally located storage device.

The host device may perform data processing by additionally using a remotely located storage device in addition to the locally located storage device.

The host device may perform data processing while communicating with the remotely located storage device. As the host device performs data processing while transmitting and receiving commands and data to and from the remotely located storage device through communication, there is a problem that data processing performance may deteriorate or an error in data processing may occur.

SUMMARY

Various embodiments of the present disclosure are directed to providing devices and systems capable of preventing or reducing an error in data processing while improving the data processing performance of a host device using a data storage device.

In an embodiment of the present disclosure, a data storage device may include: at least one memory device; a processing device configured to perform a calculation related with the at least one memory device or output a command for controlling the at least one memory device; and an interface device configured to receive, from a host device, at least one first flit according to a first sub protocol and at least one second flit according to a second sub protocol, and inhibit an operation of providing, to the processing device, out of order the at least one first flit and the at least one second flit differently from an instruction order of the host device during at least a partial period based on a setting value of a processing order flag included in each of the at least one first flit and the at least one second flit. The processing device performs the calculation or outputs the command based on one of the at least one first flit and the at least one second flit.

In an embodiment of the present disclosure, a host device may include: a processor configured to provide data and a command; and an interface device configured to generate a first flit according to a first sub protocol on the basis of the data, generate a second flit according to a second sub protocol on the basis of the command, and transmit, to an outside, the first flit and the second flit by setting a processing order flag in each of the first flit and the second flit, the processing order flag indicating whether to inhibit out-of-order processing of the first flit and the second flit.

In an embodiment of the present disclosure, a control unit may include: a memory controller configured to control a memory device; an accelerator configured to communicate with the memory controller, and perform a calculation based on data stored in the memory device; and an interface device configured to receive, from a host device, a plurality of flits in each of which a processing order flag is set, and inhibit an operation of providing, to the accelerator, out of order the plurality of flits differently from an instruction order of the host device during at least a partial period based on a setting value of the processing order flag included in each of the plurality of flits.

In an embodiment of the present disclosure, a computing system may include: a host device configured to generate at least one first flit according to a first sub protocol and at least one second flit according to a second sub protocol, and output the at least one first flit and the at least one second flit by setting a processing order flag in each of the at least one first flit and the at least one second flit; and a data storage device configured to receive, from the host device, the at least one first flit and the at least one second flit, and inhibit an operation of outputting out of order the at least one first flit and the at least one second flit differently from an instruction order of the host device during at least a partial period based on the processing order flag set in each of the at least one first flit and the at least one second flit.

According to the embodiments of the present disclosure, an error in data processing performed by a data storage device according to an instruction from a host device may be reduced, and data processing performance by the data storage device may be maintained.

DETAILED DESCRIPTION

Figure 1:
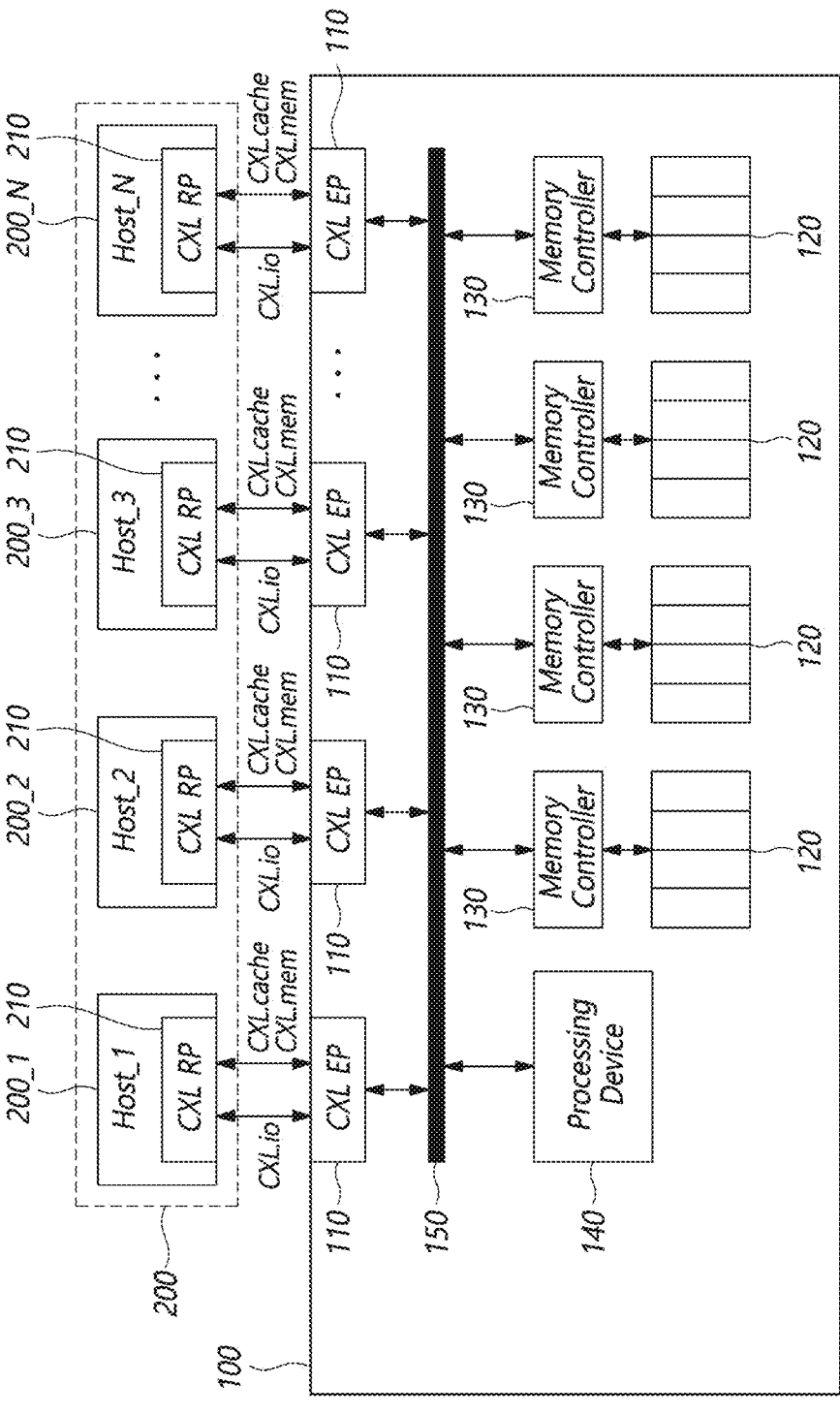
FIG. 1 is a diagram illustrating a schematic configuration of a data storage device based on an embodiment of the present disclosure.

In the following description of embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all meanings of the term "can".

Hereinafter, various embodiments of the present disclosure will be described in detail with reference to accompanying drawings.

FIG. 1 is a diagram illustrating a schematic configuration of a data storage device 100 based on an embodiment of the present disclosure.

Referring to FIG. 1, the data storage device 100 based on the embodiment of the present disclosure may include, for example, a first interface device 110, a memory device 120 and a memory controller 130. The data storage device 100 may further include a processing device 140. The components included in the data storage device 100 may communicate with each other through a bus 150, for example.

The data storage device 100 may be used by at least one host device 200. The data storage device 100 and the host device 200 may be collectively referred to as a computing system.

The computing system may include, for example, a plurality of host devices 200, and FIG. 1 illustrates as an example a case where the computing system includes N number of host devices 200_1, 200_2, 200_3, . . . , 200_N.

For example, the host device 200 may be a computer, an ultra mobile PC (UMPC), a workstation, a personal digital assistant (PDA), a tablet, a mobile phone, a smartphone, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a telematics network, a radio frequency identification (RFID) device, a mobility device (e.g., a vehicle, a robot or a drone) capable of driving under human control or autonomous driving, a wearable device, or the like. Alternatively, the host device 200 may be a virtual/augmented reality device which provides a 2D or 3D virtual reality image or augmented reality image. The host device 200 is not limited to the above examples, and may be one of various electronic devices which require the data storage device 100 capable of storing data.

The host device 200 may include at least one operating system. The operating system may manage and control overall functions and operations of the host device 200. The operating system may control the interoperation between the host device 200 and the data storage device 100. The operating system may be classified into a general operating system and a mobile operating system depending on the mobility of the host device 200.

The host device 200 may perform data processing using a memory included in the host device 200. The host device 200 may also perform data processing using the data storage device 100 which is located outside the host device 200.

The host device 200 may perform communication with the data storage device 100 through a preset interface.

For example, the host device 200 may communicate with the data storage device 100 through the Compute Express Link (CXL) interface. The host device 200 may be set as a CXL root port, and the data storage device 100 may be set as a CXL end point. Since the host device 200 communicates with the data storage device 100 through the CXL interface, a low-latency high-bandwidth access environment may be implemented in a structure which communicates with the data storage device 100 of high capacity.

Alternatively, as the case may be, the host device 200 may communicate with the data storage device 100 through an interface other than the CXL interface.

For example, the host device 200 and the data storage device 100 may communicate through at least one among various communication interfaces or standards such as a universal serial bus (USB) protocol, a multimedia card (MMC) protocol, a (peripheral component interconnection (PCI) protocol, a PCI-express (PCIe) protocol, an advanced technology attachment (ATA) protocol, a serial-ATA protocol, a parallel-ATA protocol, a small computer system interface (SCSI) protocol, an enhanced small disk interface (ESDI) protocol and an integrated drive electronics (IDE) protocol, but are not limited thereto.

As such, the type and number of host devices 200 which perform communication with the data storage device 100 based on the embodiments of the present disclosure and a communication interface between the host device 200 and the data storage device 100 may be various. However, hereinafter, a case where at least one host device 200 communicates with the data storage device 100 through the CXL interface will be described as an example.

The data storage device 100 may include at least one memory device 120. FIG. 1 illustrates as an example a case where the data storage device 100 includes four memory devices 120. The data storage device 100 may also be referred to as a data storage system.

The memory device 120 may be, for example, a volatile memory such as a DRAM, an SDRAM, a DDR SDRAM and an LPDDR SDRAM, but the embodiments of the present disclosure are not limited thereto. As the case may be, the memory device 120 may be a nonvolatile memory. Some of a plurality of memory devices 120 may be volatile memories, and the others may be nonvolatile memories. The embodiment of the disclosed technology may be applied even when only one memory device 120 is included in the data storage device 100.

The data storage device 100 may include the memory controller 130 which controls the operation of the memory device 120. FIG. 1 illustrates a case where the data storage device 100 includes four memory controllers 130 which control the four memory devices 120, respectively. As the case may be, one memory controller 130 may control the operations of at least two memory devices 120.

The memory controller 130 may control an operation of writing data to the memory device 120 or an operation of reading data from the memory device 120, according to a command inputted from the outside (e.g., the host device 200). The memory controller 130 may control a refresh operation on memory cells included in the memory device 120, depending on the type of the memory device 120. The memory controller 130 may control an operation of erasing data written to the memory device 120, depending on the type of the memory device 120.

The data storage device 100 may further include the processing device 140 which performs a calculation related with the memory device 120 or outputs a command for controlling the memory device 120. For example, the processing device 140 may perform a function of managing or controlling the memory device 120 and the memory controller 130. The processing device 140 may allocate or deallocate a memory area included in the memory device 120 according to a request from the host device 200. The processing device 140 may perform a calculation using data stored in the memory device 120 according to a command received from the host device 200, and may provide a result value. For example, the data storage device 100 may provide or store data only, and may not perform a calculation. In this case, the host device 200 may perform the calculation based on a data read from the data storage device 100. In some cases, some calculations may be performed in the data storage device 100 (e.g., by the processing device). The data transmitted and received between the host device 200 and the data storage device 100 may be reduced. For example, the host device 200 may transmit a function to instruct calculating and returning a result of the calculation to the data storage device 100. The processing device 140 in the data storage device 100 may perform the calculation based on the instruction received from the host device 200 without transmitting data used for the calculation to outside of the data storage device 100.

The processing device 140 is not limited to the above-described example. When, inside or outside the data storage device 100, a processing device performs an operation related with the memory device 120 while communicating with the memory device 120 and the memory controller 130 included in the data storage device 100, the processing device may correspond to the processing device 140 based on the embodiment of the present disclosure.

The data storage device 100 may further include an auxiliary memory capable of storing data required according to the operation of the processing device 140. The auxiliary memory may be distinguished from the memory device 120, and may be, for example, a volatile memory such as an SRAM but the embodiment is not limited thereto.

The memory device 120, the memory controller 130 and the processing device 140 included in the data storage device 100 may be disposed as separate components, respectively, or at least some of them may be integrated to be disposed as one component. As the case may be, the memory controller 130, the processing device 140 and the auxiliary memory may be implemented as chiplets, respectively, and may be packaged. In this case, the components other than the memory device 120 may be provided in the form of a single package.

The processing device 140 may be disposed separately from the memory controller 130, but, as the case may be, may be disposed by being integrated with the memory controller 130. In addition, some functions of the memory controller 130 may be provided by being implemented in the processing device 140.

The processing device 140 and the memory controller 130 may communicate with each other through the bus 150. A signal to be received from the host device 200 or a signal to be transmitted to the host device 200 may be transferred through the bus 150.

As mentioned in the above-described example, the data storage device 100 and the host device 200 may communicate with each other through the CXL interface.

The data storage device 100 may include the first interface device 110 for communication according to the CXL interface, and the host device 200 may include a second interface device 210 according to the CXL interface.

The data storage device 100 and the host device 200 may transmit and receive signals according to the determined CXL protocol. For example, the data storage device 100 and the host device 200 may transmit and receive signals according to sub protocols such as CXL.io, CXL.cache and CXL.mem.

The CXL.io protocol may be a protocol which is used for searching, connecting, setting and managing the data storage device 100. The CXL.cache protocol may be a protocol which allows the data storage device 100 to access the host device 200. The CXL.mem protocol may be a protocol which allows the host device 200 to access the data storage device 100. In the present specification, the CXL.cache protocol and the CXL.mem protocol regarding data may be referred to as first sub protocols, and the CXL.io protocol regarding command processing may be referred to as a second sub protocol.

The host device 200 and the data storage device 100 may perform data processing by transmitting and receiving flits (or packets) according to the above-described protocol. Transmission and reception of flits may be performed by the second interface device 210 included in the host device 200 and the first interface device 110 included in the data storage device 100.

Figure 2:
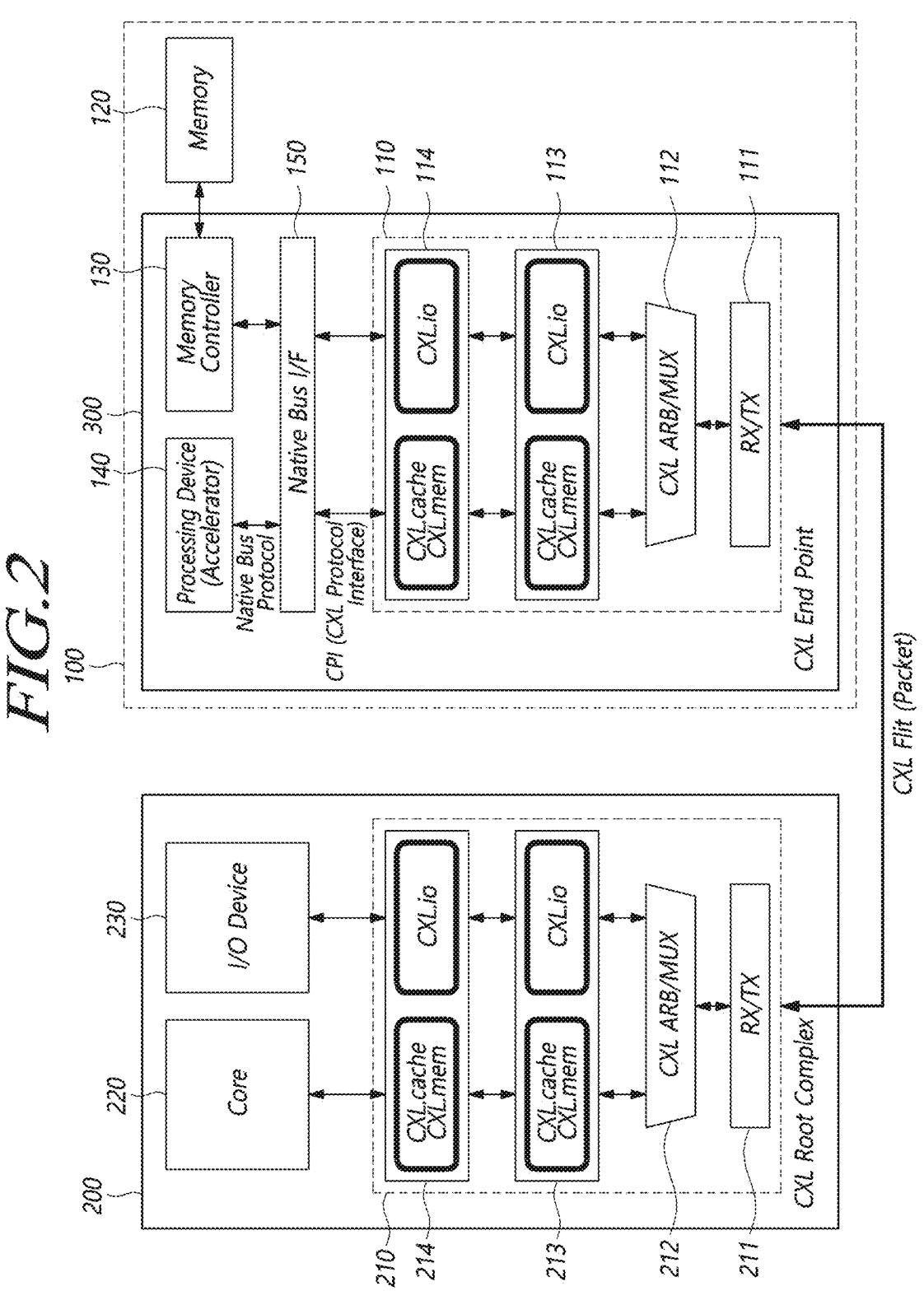
FIG. 2 is a diagram illustrating a schematic configuration of a computing system based on an embodiment of the present disclosure.

FIG. 2 is a diagram illustrating a schematic configuration of a computing system based on an embodiment of the present disclosure.

Referring to FIG. 2, the first interface device 110 included in the data storage device 100 may include, for example, a physical layer 111, a multiplexer 112, a data link layer 113 and a translation layer 114. The first interface device 110 may receive a flit according to the CXL protocol, may process the received flit, and may provide the processed flit to the memory controller 130 or the processing device 140 through the bus 150.

FIG. 2 illustrates a case where the processing device 140 is an accelerator, but the embodiment of the present disclosure is not limited thereto. Besides an accelerator, the processing device 140 may be a unit, such as a microcontroller unit, which performs an operation related with the memory device 120 while communicating with the memory device 120 or the memory controller 130.

The processing device 140 or the memory controller 130 which receives the flit through the first interface device 110 may perform an operation based on the flit.

As the case may be, the first interface device 110 may be implemented by being integrated with at least one of the memory controller 130 and the processing device 140. For example, the first interface device 110, the memory controller 130 and the processing device 140 may configure a control unit 300. For example, the control unit 300 may be provided in the form of a module which is implemented separately from the memory device 120. As the case may be, the memory controller 130 and the memory device 120 may be implemented together, and the first interface device 110 and the processing device 140 may be implemented together.

The flit transmitted to the data storage device 100 may be generated and transmitted by the second interface device 210 of the host device 200.

The second interface device 210 included in the host device 200 may include, for example, a physical layer 211, a multiplexer 212, a data link layer 213 and a translation layer 214. The components included in the second interface device 210 may correspond to the components included in the first interface device 110.

The host device 200 may include a core processor 220 and an input/output (I/O) device 230. The core processor 220 and the input/output device 230 may provide, to the second interface device 210, a command or data to be transmitted according to a user's input. The second interface device 210 may generate flits based on the command and the data received from the core processor 220 and the input/output device 230, and may transmit the generated flits to the data storage device 100.

The translation layer 214 included in the second interface device 210 may generate packets based on the command and the data, and the data link layer 213 may add headers, etc. to the generated packets. A first flit may be generated according to the first sub protocol such as the CXL.cache protocol or the CXL.mem protocol and a second flit may be generated according to the second sub protocol such as CXL.io protocol, to be transferred to the multiplexer (i.e., CXL ARB/MUX) 212. The ARB may be an arbiter circuit which is used for controlling an access when using (shared) resources. The first flit and the second flit transferred to the physical layer 211 through the multiplexer 212 may be transmitted to the physical layer 111 of the first interface device 110 included in the data storage device 100. The physical layer 211 may transmit (TX) flits to the physical layer 111, and may receive (RX) flits from the physical layer 111.

The physical layer 111 of the first interface device 110 may transfer, to the multiplexer 112, the flits received from the host device 200. The multiplexer 112 may output the received flits separately according to sub protocols, and the outputted flits may be provided to the processing device 140 or the memory controller 130 through the data link layer 113 and the translation layer 114.

As the case may be, for the efficiency of flit transmission, the first interface device 110 may provide the flits differently from an instruction order or reception order of the flits (allowing out-of-order processing or out-of-order output). In a case where an error is likely to occur due to a change in an output order of the flits, the change in the output order of the flits may be inhibited (inhibiting out-of-order processing or out-of-order output). Through this, an error in data transmission and reception according to the CXL protocol between the host device 200 and the data storage device 100 may be prevented or reduced, and data transmission and reception performance may be improved.

For example, the first interface device 110 may process the flits by determining whether to adjust a processing order of the flits, based on values set in the flits by the second interface device 210.

Figure 3:
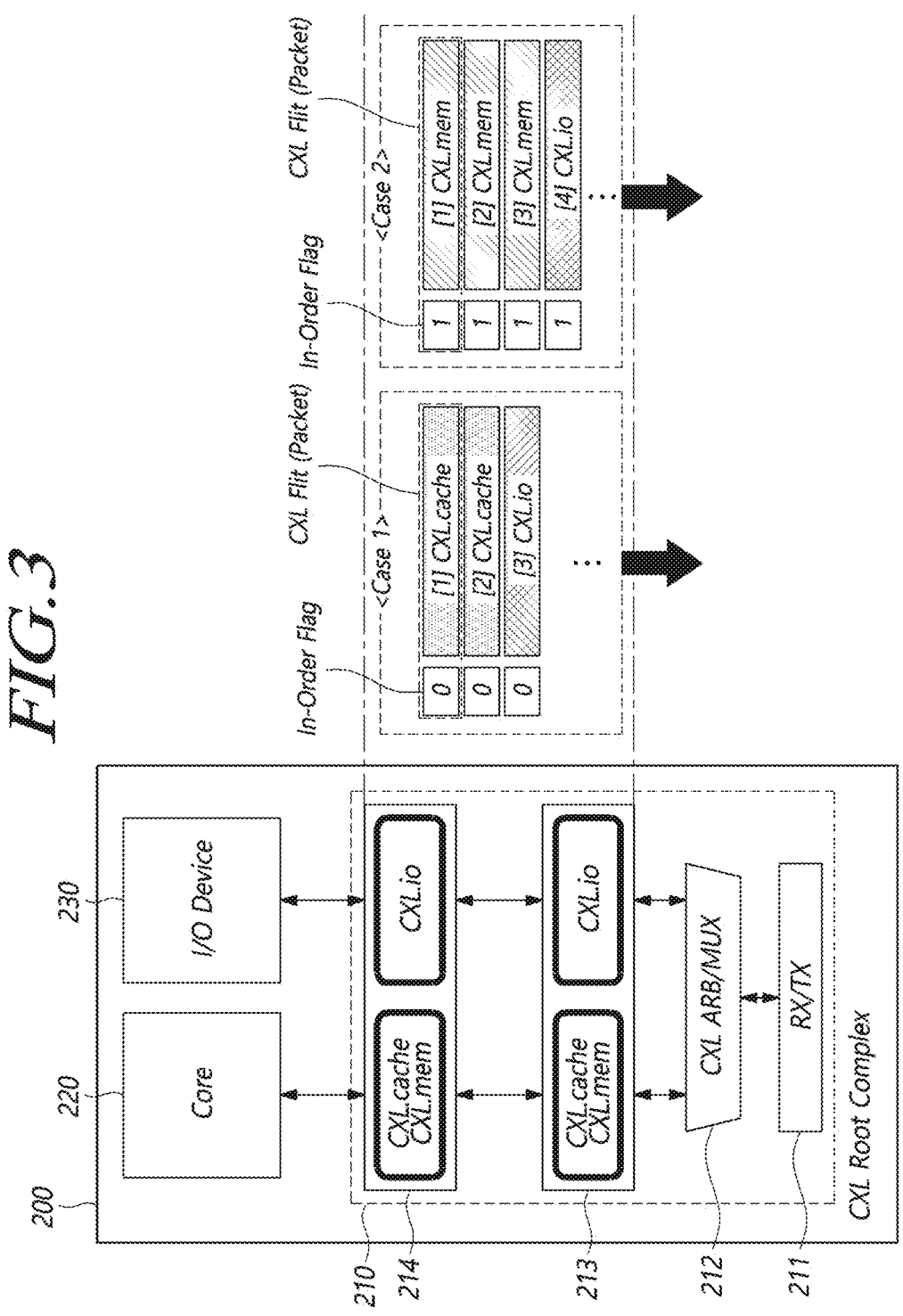
FIG. 3 is a diagram illustrating a method in which an interface device included in a host device based on the embodiment of the present disclosure generates and transmits flits.

FIG. 3 is a diagram illustrating a method in which the second interface device 210 included in the host device 200 based on the embodiment of the present disclosure generates and transmits flits.

Referring to FIG. 3, the second interface device 210 of the host device 200 may generate a flit according to a command or data provided by the core processor 220 or the input/output device 230.

For example, the translation layer 214 of the second interface device 210 may generate a flit according to the CXL. cache protocol, the CXL.mem protocol or the CXL.io protocol. The translation layer 214 of the second interface device 210 may generate flits, and may set a processing order flag (or an in-order flag) in each flit.

For example, when in-order processing of generated flits is required and out-of-order processing is not allowed, the translation layer 214 of the second interface device 210 may set, to a first value (e.g., "1"), the setting value of the processing order flag included in a corresponding flit. When in-order processing of generated flits is not necessarily required and out-of-order processing is allowed differently from an instruction order of the host device 200, the translation layer 214 of the second interface device 210 may set, to a second value (e.g., "0"), the setting value of the processing order flag included in a corresponding flit or may not set the processing order flag. A processing order flag may indicate whether to inhibit (or allow) out-of-order processing of a plurality of flits.

The above-described method of setting a processing order flag is an example, and a processing order flag may be set using any of reserved fields in a flit structure according to the CXL protocol.

Referring to <Case 1> and <Case 2> illustrated in FIG. 3, <Case 1> illustrates as an example a case where two flits according to the CXL.cache protocol and one flit according to the CXL.io protocol are generated.

A processing order flag may be set in each of the two flits according to the CXL.cache protocol and the one flit according to the CXL.io protocol. <Case 1> illustrates a case where processing order flags are set as the second value ("0") for all three flits. Since the processing order flags are set as the second value, the three corresponding flits may be allowed to be processed out of order.

<Case 2> illustrates as an example a case where three flits according to the CXL.mem protocol and one flit according to the CXL.io protocol are generated.

A processing order flag may be set in each of the three flits according to the CXL.mem protocol and the one flit according to the CXL.io protocol. <Case 2> illustrates a case where processing order flags are set as the first value ("1") for all four flits. Since the processing order flags are set as the first value, in-order processing for the corresponding four flits may be required.

As in the above-mentioned example, the processing order flag may be set by the translation layer 214 of the second interface device 210. However, as the case may be, the processing order flag may be set in a process in which the data link layer 213 adds a header.

In this way, a flit in which a processing order flag is set may be generated and transmitted to the outside (e.g., the data storage device 100). The data storage device 100 which receives a flit in which a processing order flag is set may control the order of processing the received flit based on the processing order flag.

Figure 4:
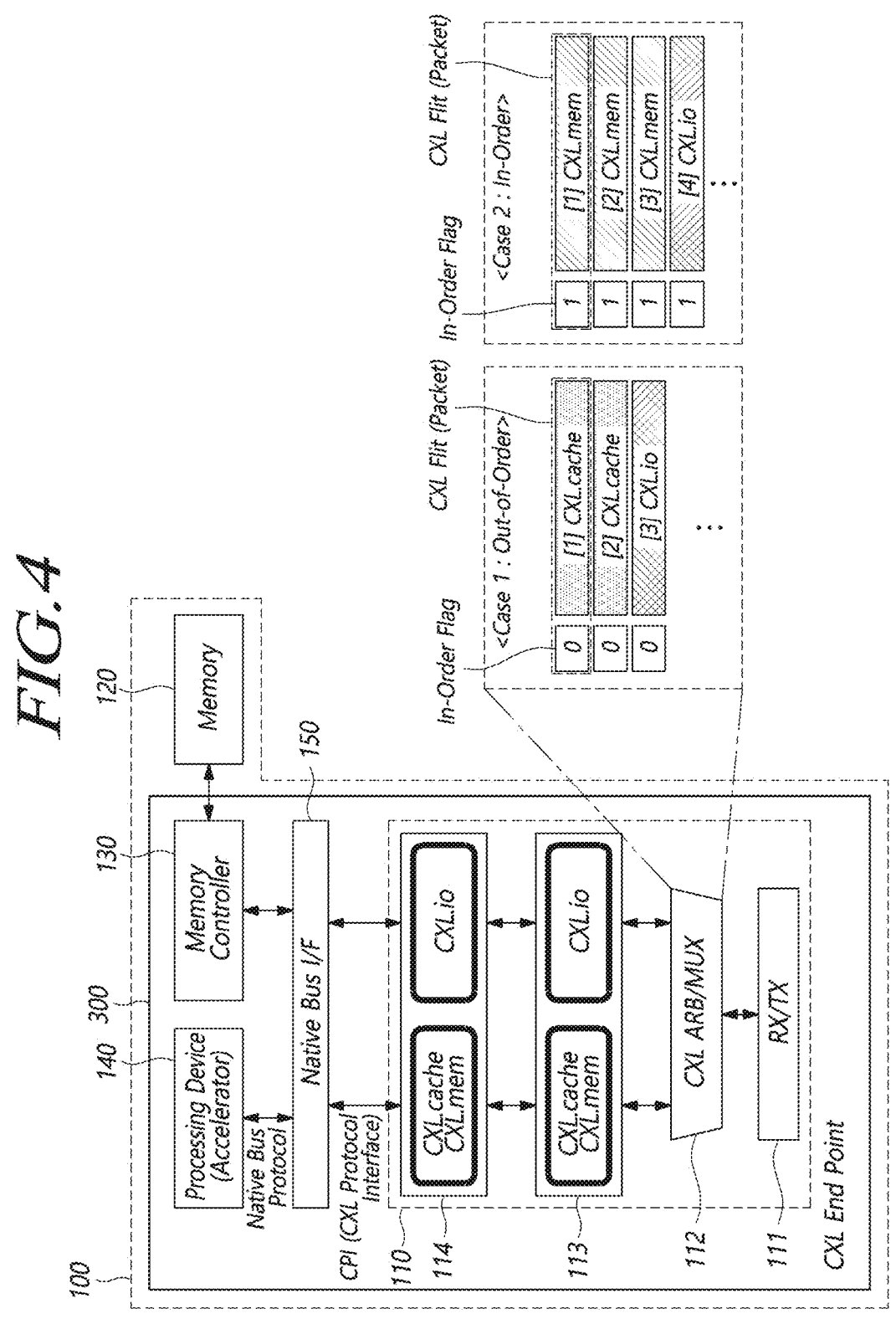
FIGS. 4 to 6 are diagrams illustrating a method in which an interface device included in the data storage device based on the embodiment of the present disclosure controls an order of outputting received flits.
Figure 5:
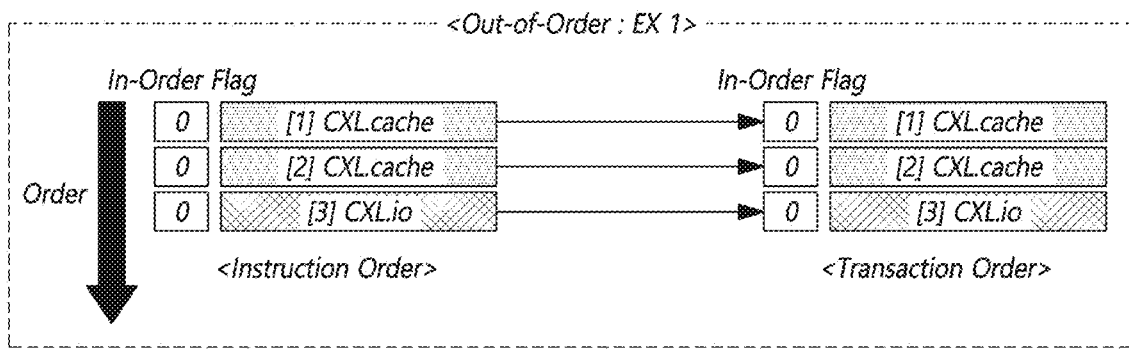
Figure 5:
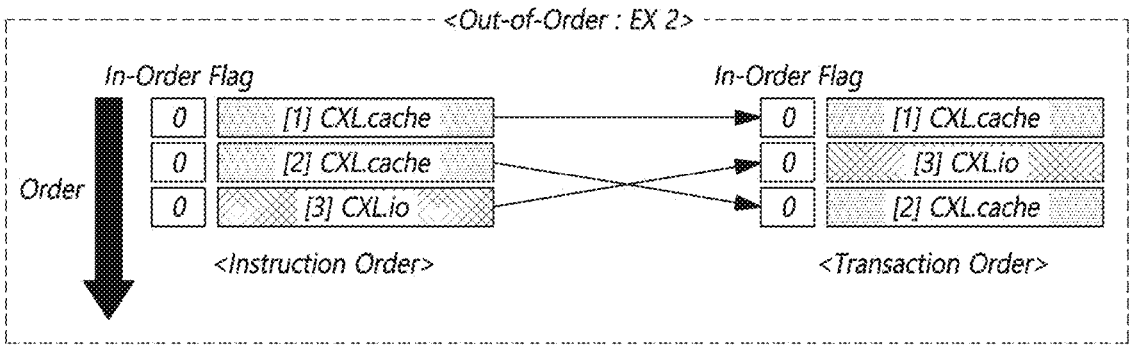
Figure 6:
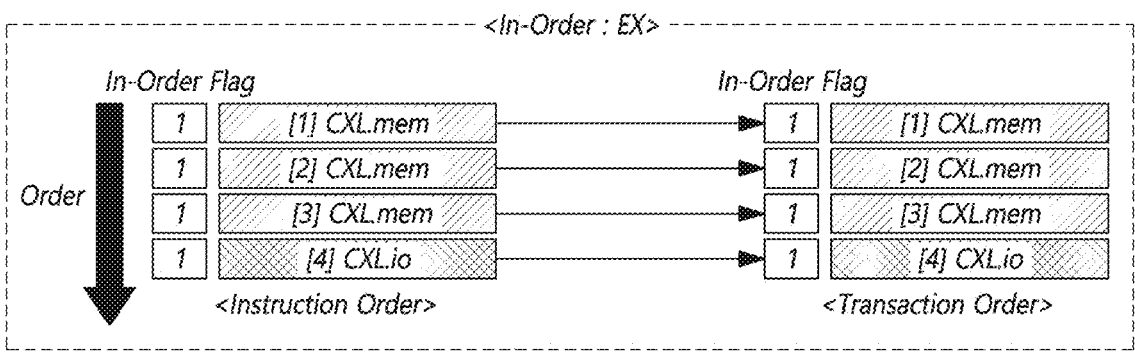

FIGS. 4 to 6 are diagrams illustrating a method in which the first interface device 110 included in the data storage device 100 based on the embodiment of the present disclosure controls an order of outputting received flits.

Referring to FIG. 4, the data storage device 100 may receive, from the host device 200, at least one first flit according to a first sub protocol and at least one second flit according to a second sub protocol. The first sub protocol may be the CXL.cache protocol or the CXL.mem protocol, and the second sub protocol may be the CXL.io protocol.

The physical layer 111 of the first interface device 110 included in the data storage device 100 may receive a flit. The flit received by the physical layer 111 of the first interface device 110 may be transferred to the multiplexer 112 of the first interface device 110.

The multiplexer 112 of the first interface device 110 may check the setting value of a processing order flag included in each received flit. The multiplexer 112 of the first interface device 110 may control the output order of the received flit based on the setting value of the processing order flag.

Referring to <Case 1> illustrated in FIG. 4, a case where the multiplexer 112 of the first interface device 110 receives two flits according to the CXL.cache protocol and one flit according to the CXL.io protocol is illustrated.

Since the processing order flags included in the respective three flits are all set as the second value ("0"), the multiplexer 112 of the first interface device 110 may determine the output order of the flits while operating according to a second mode. The second mode may be, for example, a mode in which out-of-order processing is allowed (i.e., a mode in which out-of-order processing is not inhibited), and the multiplexer 112 of the first interface device 110 may output in order the three flits according to the instruction order of the host device 200 or may output out of order the three flits differently from the instruction order of the host device 200.

The multiplexer 112 of the first interface device 110 may output in order the three flits or may output out of order at least one of the three flits.

Referring to FIG. 5, as in the case of <EX 1>, even when the processing order flags included in the respective three flits are all set as the second value ("0"), the three flits may be outputted in order.

The three flits outputted in order by the multiplexer 112 of the first interface device 110 may be translated through the data link layer 113 and the translation layer 114. According to the order in which the three flits are outputted by the multiplexer 112 of the first interface device 110, translation on the three flits may be performed, and the translated three flits may be provided to the processing device 140 or the like. The order of the flits to be provided to the processing device 140 may be adjusted by the multiplexer 112 of the first interface device 110.

For another example, as in the case of <EX 2>, when the processing order flags included in the respective three flits are all set as the second value ("0"), at least one of the three flits may be outputted out of order. A third flit according to the CXL.io protocol may be outputted earlier than a second flit according to the CXL.cache protocol. Translation on the third flit according to the CXL.io protocol may be performed earlier. A command or the like corresponding to the third flit according to the CXL.io protocol may be provided to the processing device 140 earlier than data corresponding to the second flit according to the CXL.cache protocol.

When there is a transmission delay or error in the second flit according to the CXL.cache protocol, the multiplexer 112 of the first interface device 110 may output earlier the third flit according to the CXL.io protocol. The first interface device 110 may prevent or reduce a degradation in the overall performance of the system attributable to a delay in processing of flits received by the first interface device 110 due to abnormality of a flit.

According to the setting values of processing order flags, the multiplexer 112 of the first interface device 110 may output in order received flits.

Referring back to <Case 2> illustrated in FIG. 4, a case where the multiplexer 112 of the first interface device 110 receives three flits according to the CXL.mem protocol and one flit according to the CXL.io protocol is illustrated.

Since the setting values of the processing order flags included in the respective four flits are all set as the first value ("1"), the multiplexer 112 of the first interface device 110 may recognize that in-order outputting and processing of the four flits are required. At least two flits in which the first value ("1") is set to require in-order processing may be consecutively received.

The multiplexer 112 of the first interface device 110 may output in order the four flits while operating according to a first mode. The first mode may be a mode in which in-order processing is performed, and may be a mode in which out-of-order processing is inhibited. The four flits outputted in order may be translated through the data link layer 113 and the translation layer 114.

Referring to FIG. 6, an order in which the flits are outputted by the multiplexer 112 of the first interface device 110 may be the same as an instruction order. A first flit according to the CXL.mem protocol, a second flit according to the CXL.mem protocol, a third flit according to the CXL.mem protocol and a fourth flit according to the CXL.io protocol may be outputted in order, and may be translated according to the output order. The four flits may be translated and provided in order to the processing device 140 or the like.

For example, in the case where a command corresponding to the fourth flit according to the CXL.io protocol is a command which instructs a calculation using data corresponding to the previous three flits according to the CXL.mem protocol, if out-of-order processing is allowed, the command corresponding to the fourth flit according to the CXL.io protocol may be provided earlier to the processing device 140. The processing device 140 may perform a calculation in a state in which reception of at least one of the three flits according to the CXL.mem protocol is not completed, and in this case, an operation error may occur.

Since the multiplexer 112 of the first interface device 110 controls the output order of the flits based on the processing order flags, the translation by the data link layer 113 and the translation layer 114 may also be performed in order. Since the flits are provided in order to the processing device 140, it is possible to prevent an error from occurring in an operation by the processing device 140.

A case where the processing device 140 calculates data has been described as an example. However, in addition to the example, in a case where an error may occur during out-of-order processing, in-order processing may be performed through setting of the processing order flags. For example, the host device 200 may transmit a command which instructs to store data of the local memory of the host device 200 or another host device in a certain area of the memory device 120 included in the data storage device 100 and to migrate the data stored in the corresponding area in the memory device 120 or the data storage device 100. In this case, since data storage and migration should be performed in order, the processing order flags included in corresponding flits may be set as the first value ("1") and be transmitted to the first interface device 110 of the data storage device 100.

As such, according to the embodiment of the present disclosure, by the processing order flag set in each flit, it is possible to provide devices and systems capable of preventing the occurrence of an error due to a variation in the translation order of flits while preventing or reducing a degradation in flit translation efficiency in the first interface device 110 of the data storage device 100.

The multiplexer 112 of the first interface device 110 of the data storage device 100 may control the order and method of outputting flits in various ways according to the setting values of processing order flags.

Figure 7:
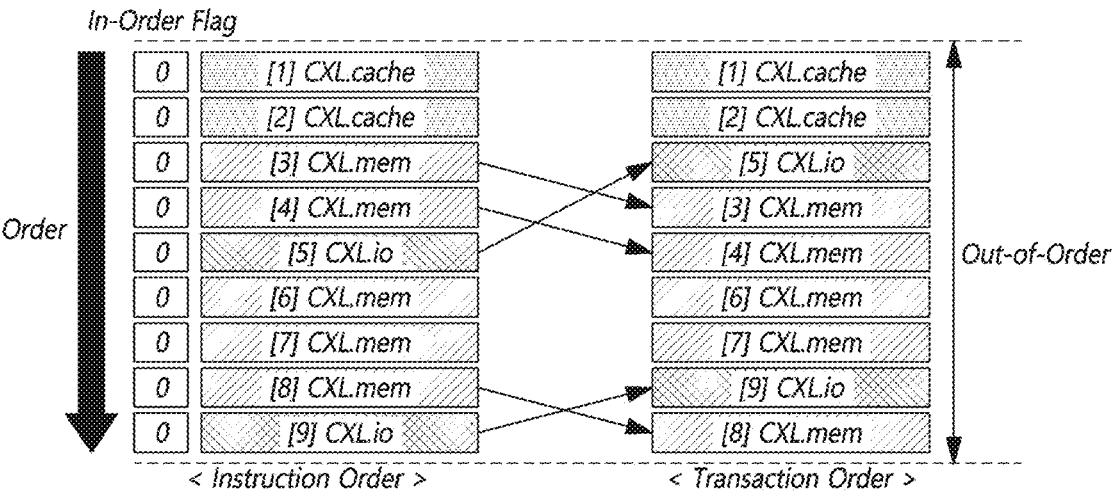
FIGS. 7 and 8 are diagrams illustrating a method in which the interface device included in the data storage device based on the embodiment of the present disclosure receives and processes flits.
Figure 8:
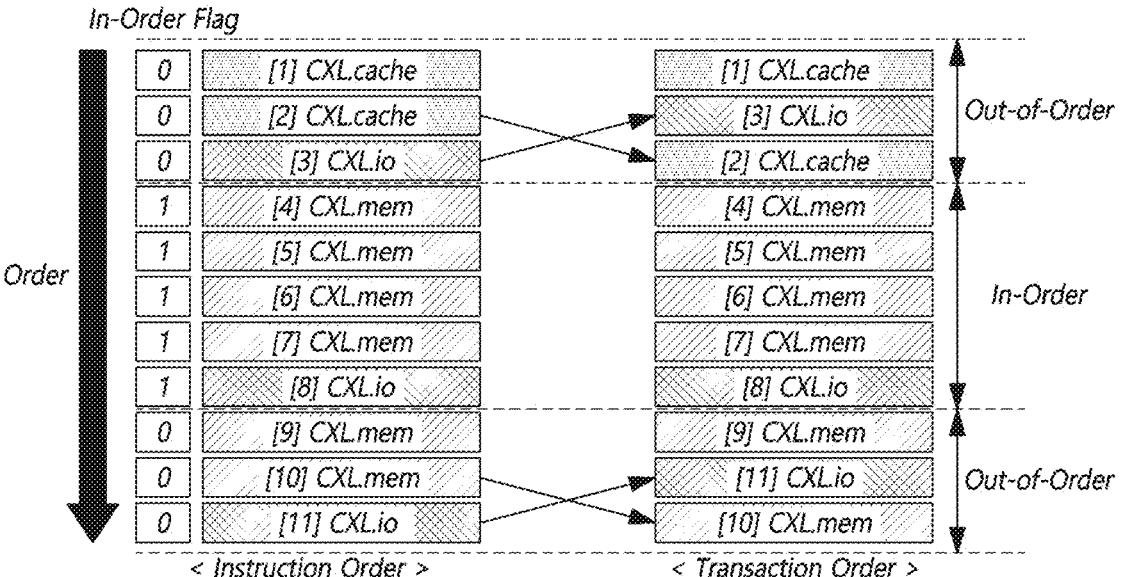

FIGS. 7 and 8 are diagrams illustrating a method in which the first interface device 110 included in the data storage device 100 based on the embodiment of the present disclosure receives and processes flits.

Referring to FIG. 7, a case where processing order flags included in flits transmitted by the host device 200 are all set to the second value ("0") is illustrated as an example.

The multiplexer 112 of the first interface device 110 included in the data storage device 100 may control in-order processing or out-of-order processing based on the processing order flags included in the flits received from the host device 200. Since the setting values of the processing order flags included in the nine received flits [1]-[9] are all the second value ("0"), the multiplexer 112 may output the flits by changing, if necessary, the output order of the flits.

For example, the multiplexer 112 of the first interface device 110 may preferentially output a fifth flit according to the CXL.io protocol (i.e., [5] CXL.io) earlier than third and fourth flits according to the CXL.mem protocol (i.e., [3], [4] CXL.mem). The multiplexer 112 of the first interface device 110 may preferentially output a ninth flit according to the CXL.io protocol (i.e., [9] CXL.io) earlier than an eighth flit according to the CXL.mem protocol (i.e., [8] CXL.mem). Translation on preferentially outputted flits may be performed earlier. The flits which are translated earlier may be provided earlier to the processing device 140.

In a case where there occurs a state in which the output of the third and fourth flits according to the CXL.mem protocol or the eighth flit according to the CXL.mem protocol is delayed, other flits are preferentially outputted and translated, and thus, it is possible to prevent or reduce a degradation in data transmission and reception performance due to the delay in output of the flits.

Depending on the setting values of the processing order flags included in flits, the multiplexer 112 of the first interface device 110 may operate according to a mode in which in-order processing is performed, or according to respective periods of flits, may operate according to a mode in which in-order processing and out-of-order processing are performed.

Referring to FIG. 8, a case where the data storage device 100 receives 11 flits [1]-[11] from the host device 200 is illustrated as an example.

The setting values of the processing order flags included in first, second and third flits [1]-[3] may be the second value ("0"). The setting values of the processing order flags included in fourth, fifth, sixth, seventh and eighth flits [4]-[8] may be the first value ("1"). The setting values of the processing order flags included in the ninth, tenth and eleventh flits [9]-[11] may be the second value ("0").

In each period depending on the setting values of processing order flags, the multiplexer 112 of the first interface device 110 may operate in the first mode for in-order processing or may operate in the second mode in which out-of-order processing is allowed.

The multiplexer 112 of the first interface device 110 may operate in the second mode in a period in which the first, second and third flits [1]-[3] are received. The multiplexer 112 of the first interface device 110 may output in order the three flits or may output out of order the three flits as in the example illustrated in FIG. 8.

The multiplexer 112 of the first interface device 110 may operate in the first mode in a period in which the fourth, fifth, sixth, seventh and eighth flits [4]-[8] are received. The multiplexer 112 of the first interface device 110 may output the flits in order in the corresponding period while inhibiting out-of-order processing.

For example, when receiving a flit whose setting value of a processing order flag is the first value ("1"), the multiplexer 112 of the first interface device 110 may output in order flits received till a flit whose setting value of a processing order flag is not the first value ("1") is received, after receiving the flit whose setting value of the processing order flag is not the first value ("1"). During a period in which flits whose setting values of processing order flags are the first value ("1") are received, the multiplexer 112 of the first interface device 110 may hold the corresponding flits, and when a flit whose setting value of a processing order flag is the second value ("0") is received, may output the held flits in order.

Alternatively, as the case may be, when a flit according to the second protocol is received during a period in which flits whose setting values of processing order flags are the first value ("1") are received, the multiplexer 112 of the first interface device 110 may output in order flits which are held in the corresponding period.

For example, flits according to the first sub protocol whose setting values of processing order flags are the first value ("1") may be received. The multiplexer 112 of the first interface device 110 may hold the corresponding flits according to the first sub protocol, and then, when a flit according to the second sub protocol whose setting value of a processing order flag is the first value ("1") is received, may output in order the flits received by that time. Since a command corresponding to a flit according to the second sub protocol may instruct processing of data corresponding to a flit according to the first sub protocol, data processing by the corresponding flit may be performed normally.

Since it is possible to prevent a flit according to the second sub protocol from being outputted earlier than a flit according to the first sub protocol, occurrence of an error due to out-of-order processing may also be prevented.

The multiplexer 112 of the first interface device 110 may operate in the second mode in a period in which the ninth, tenth and eleventh flits [9]-[11] are received, and may output the corresponding flits in order or out of order. Translation may be performed so that the efficiency of processing flits is not degraded while preventing occurrence of an error.

According to the above-described embodiment of the present disclosure, by setting processing order flags in flits transmitted and received between the host device 200 and the data storage device 100, in-order processing or out-of-order processing may be controlled. Therefore, it is possible to provide a protocol capable of preventing occurrence of an error due to out-of-order processing of a flit while not degrading the efficiency of processing flits transmitted and received.

Although various embodiments of the present disclosure have been described with particular specifics and varying details for illustrative purposes, those skilled in the art will appreciate that various modifications, additions and substitutions may be made based on what is disclosed or illustrated in the embodiments of the present disclosure without departing from the spirit and scope of the present disclosure as defined in the following claims. Furthermore, the embodiments may be combined to form additional embodiments.

What is claimed is:

1. A data storage device comprising:
at least one memory device;
a processing device configured to perform a calculation related to the at least one memory device or output a command for controlling the at least one memory device; and
an interface device configured to receive, from a host device, at least one first flit according to a first sub protocol and at least one second flit according to a second sub protocol, and inhibit an operation of providing, to the processing device, out of order the at least one first flit and the at least one second flit differently from an instruction order of the host device based on a setting value of a processing order flag included in each of the at least one first flit and the at least one second flit,
wherein the processing device performs the calculation or outputs the command based on one of the at least one first flit and the at least one second flit,
wherein the interface device comprises:
a physical layer configured to receive the at least one first flit and the at least one second flit;
a multiplexer configured to check the setting value of the processing order flag included in each of the at least one first flit and the at least one second flit, and adjust an output order of the at least one first flit and the at least one second flit; and
a data link layer and a translation layer configured to translate the at least one first flit and the at least one second flit outputted by the multiplexer, and provide, to the processing device, the translated at least one first flit and at least one second flit, and
wherein the multiplexer outputs remaining portions of the at least one first flit and the at least one second flit, the remaining portions being obtained by excluding the processing order flag from the at least one first flit and the at least one second flit.

2. The data storage device according to claim 1, wherein the multiplexer operates in a first mode when the setting value of the processing order flag is a first value, and outputs in order the at least one first flit and the at least one second flit according to the instruction order.

3. The data storage device according to claim 1, wherein the multiplexer holds output of the at least one first flit and the at least one second flit when receiving a flit having a setting value of the processing order flag of a first value, and outputs in order the held at least one first flit and at least one second flit according to the instruction order when receiving a flit having a setting value of the processing order flag other than the first value.

4. The data storage device according to claim 1, wherein, after receiving the at least one first flit in which the setting value is a first value, when receiving the at least one second flit in which the setting value is the first value, the multiplexer outputs in order the at least one first flit received before receiving the at least one second flit, according to the instruction order.

5. The data storage device according to claim 1, wherein the multiplexer operates in a second mode when the setting value of the processing order flag is a second value, and outputs the at least one first flit and the at least one second flit out of order by comparing the at least one first flit and the at least one second flit with the instruction order.

6. The data storage device according to claim 5, wherein the data link layer and the translation layer translate the at least one first flit and the at least one second flit according to an order in which the at least one first flit and the at least one second flit are received from the multiplexer, and provide, to the processing device, the translated at least one first flit and at least one second flit in an order different from the instruction order.

7. The data storage device according to claim 1, wherein the processing device performs the calculation based on data according to the at least one first flit and outputs the command according to the at least one second flit.

8. The data storage device according to claim 7, wherein the processing device performs an operation corresponding to the command based on the data.

9. A control unit comprising:
a memory controller configured to control a memory device;
an accelerator configured to communicate with the memory controller, and perform a calculation based on data stored in the memory device; and
an interface device configured to receive, from a host device, a plurality of flits in each of which a processing order flag is set, and inhibit an operation of providing, to the accelerator, out of order the plurality of flits differently from an instruction order of the host device based on a setting value of the processing order flag included in each of the plurality of flits,
wherein the interface device comprises a physical layer, a translation layer and a multiplexer between the physical layer and the translation layer, and
wherein the multiplexer outputs remaining portions of each of the plurality of flits, the remaining portions being obtained by excluding the processing order flag from each of the plurality of flits.

10. The control unit according to claim 9, wherein the interface device provides, to the accelerator, in order the plurality of flits according to the instruction order when the setting value of the processing order flag included in each of the plurality of flits is a first value.

11. The control unit according to claim 9, wherein the interface device allows the plurality of flits to be provided to the accelerator out of order differently from the instruction order, when the setting value of the processing order flag included in each of the plurality of flits is a second value.

12. The control unit according to claim 9,
wherein the multiplexer checks the setting value of the processing order flag included in each of the plurality of flits and controls an output order of the plurality of flits.

13. A computing system comprising:
a host device configured to generate at least one first flit according to a first sub protocol and at least one second flit according to a second sub protocol, and output the at least one first flit and the at least one second flit by setting a processing order flag in each of the at least one first flit and the at least one second flit; and a data storage device configured to receive, from the host device, the at least one first flit and the at least one second flit, and inhibit an operation of outputting out of order the at least one first flit and the at least one second flit differently from an instruction order of the host device based on the processing order flag set in each of the at least one first flit and the at least one second flit, wherein the data storage device holds output of the at least one first flit and the at least one second flit when receiving a flit having a setting value of the processing order flag of a first value, and outputs in order the held at least one first flit and at least one second flit according to the instruction order when receiving a flit having a setting value of the processing order flag other than the first value.

14. The computing system according to claim 13, wherein the data storage device outputs in order the at least one first flit and the at least one second flit according to the instruction order when a setting value of the processing order flag set in each of the at least one first flit and the at least one second flit is the first value, and the data storage device allows the at least one first flit and the at least one second flit to be outputted out of order differently from the instruction order, when a setting value of the processing order flag set in each of the at least one first flit and the at least one second flit is a second value.

15. The computing system according to claim 13, wherein the host device comprises:

a processor configured to provide data and a command; and an interface device configured to generate and output the at least one first flit and the at least one second flit, and set the processing order flag in each of the at least one first flit and the at least one second flit, wherein the processing order flag indicating whether to inhibit out-of-order processing of the first flit and the second flit.

16. The computing system according to claim 15, wherein interface device comprises:

a translation layer and a data link layer configured to receive, from the processor, the data and the command and generate the first and second flits in the form of packets based on the data and the command, respectively; and a physical layer configured to transmit the first and second flits to the outside, wherein the processing order flag is set in the translation layer or the data link layer.

17. The computing system according to claim 15, wherein the interface device sets, to the first value, a setting value of the processing order flag included in each of the at least one first flit and the at least one second flit in a period in which in-order output is required, and sets, to a second value, a setting value of the processing order flag included in each of the at least one first flit and the at least one second flit in a period in which out-of-order outputs is allowed.

18. The computing system according to claim 15, wherein at least two of the at least one first flit or the at least one second flit in which the setting value of the processing order flag is set to the first value are consecutive.

* * * * *